Aug. 18, 1931.                A. W. MARTIN ET AL                1,819,782
                  LOCOMOTIVE FLUID PRESSURE PISTON ROD REMOVER
                             Filed March 14, 1930
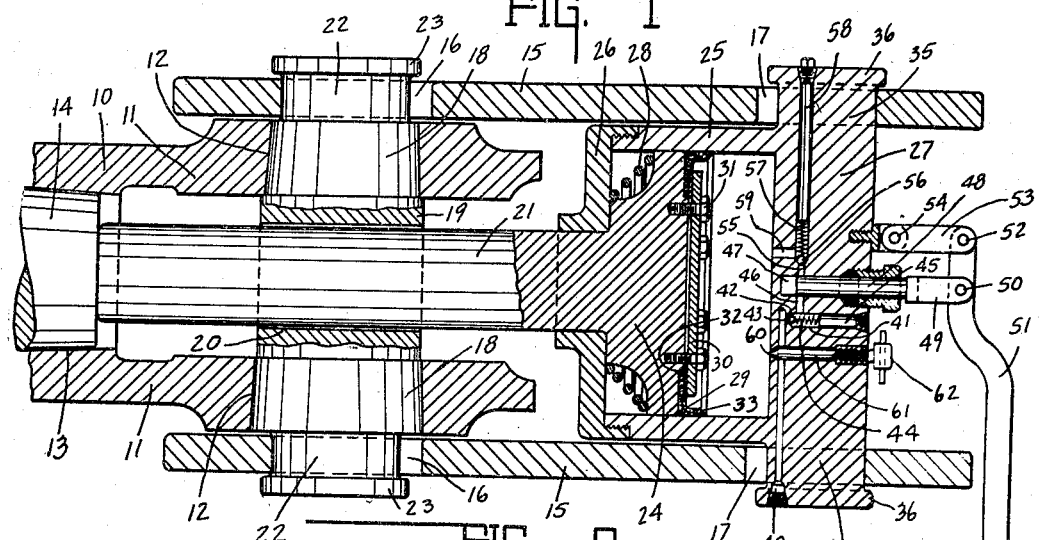
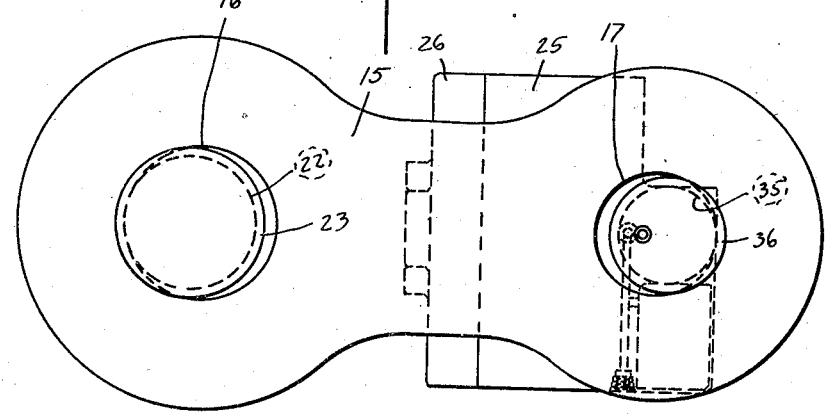
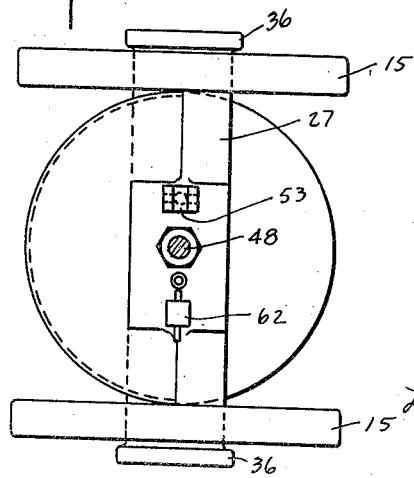
INVENTORS.
ALBERT W. MARTIN.
JACOB N. MARTIN.
BY
Lockwood Lockwood Goldsmith & Galt
ATTORNEYS.

Patented Aug. 18, 1931

1,819,782

UNITED STATES PATENT OFFICE

ALBERT W. MARTIN AND JACOB N. MARTIN, OF INDIANAPOLIS, INDIANA

LOCOMOTIVE FLUID PRESSURE PISTON ROD REMOVER

Application filed March 14, 1930. Serial No. 435,973.

This invention relates to apparatus for parting the crosshead and piston rod of a locomotive or a similar device.

The chief object of this invention is to provide a device that may be readily associated with the crosshead and piston rod connected thereto for parting such connection and which parting may be controlled.

One feature of the device consists in the mounting of the same as an attachment.

Another feature of the device consists in the application of fluid pressure for the actuation of the device.

The full nature of the invention will be understood from the accompanying drawings and the following description and claims:

In the drawings Fig. 1 is a horizontal sectional view through the crosshead and the attachment, a portion of the piston rod and other parts being shown in elevation.

Fig. 2 is a side elevation of a portion of the device.

Fig. 3 is an end view thereof.

In the drawings 10 indicates the crosshead having the crosshead pin receiving flanges 11, each provided with an opening 12, said openings registering with each other. The crosshead has a piston rod receiving socket 13 which wedgingly receives the end of the piston rod 14. A pair of links in the form of plates 15 each includes enlarged openings 16 and 17 adjacent the ends.

The crosshead pin is removed from the crosshead and another pin is substituted therefor. Said pin includes the crosshead receivable portions 18 and the intermediate portion 19, which is apertured transversely as at 20, and slidable and in aligned relation is a flange 11. Each end of the pin terminates in a reduced portion 22 which is laterally enlarged at 23. The opening 16 in each plate is of sufficient size to permit longitudinal passage of the enlargement 23 therethrough and the plate 15 is seated in a groove 22 formed between the enlargement 23 and the crosshead receivable portion 18.

The plates when thus mounted straddle the plunger 21 which lies intermediate the same. The plunger terminates in a piston 24 reciprocatorily mounted in the cylinder 25 having the piston retainer 26 and the head portion 27. Included between the portion 26 and the piston is a coil spring 28 which normally retracts the piston 24 and plunger 21 from piston rod engagement.

Any suitable form of piston construction may be employed. Herein the piston is shown provided with a cup shaped washer 29 retained by plate 30 secured as at 31, the cup shaped washer being seated in recess 32 and the peripheral portion of the washer engaging the cylinder side wall.

The cylinder head is extended transversely and oppositely to form bearing members 35 which terminate in retaining flanges 36. The openings 17 in the plates are sufficiently large to permit longitudinal passage of the enlargements 35 and flanges 36 therethrough so that the piston is locked between and to the plates when pressure is applied to the cylinder and the plunger is engaged with the piston rod.

The means for supplying pressure to the cylinder and for relieving the same therefrom includes the following. An intake port 40 communicates with a transverse passage 41 through a throat 42 controlled by a ball 43 backed by a spring 44, the tension of which is adjusted by the member 45, adjustably mounted in passage 41. The passage 46 communicates with a cylinder 47 that supports a plunger or piston 48 and the plunger terminates in a yoke 49 pivotally supported at 50 by a lever 51, pivotally supported at one end 52 by the links 53 upon the cylinder head as at 54. Reciprocation of lever 51 serves to draw fluid into the cylinder 47 through passage 40, port 42 and passage 46. Return movement of the piston 48 serves to force the compressed fluid out through the passage 55 past the check valve 56 backed by spring 57, the tension of which is adjusted by the member 58, and the compressed fluid passing by the same discharges through the port 59 to the interior of cylinder 25. Building up the pressure in the cylinder 25 causes the plunger 21 to move toward the left and to free the piston rod from the crosshead.

To relieve the pressure in the cylinder the port 60 is provided, which is controlled by the needle valve 61 having the cylinder exposed portion 62 for manual manipulation. Port 60 when valve 61 is retracted and open, freely communicates with the passage 40 so that passage 40 serves as an intake passage and also as a discharge passage. On the release of pressure the spring 28 becomes effective to return the piston in a position adjacent the head portion of the cylinder.

From the foregoing it will be understood that the apparatus may be readily applied to the cross-head and piston of a locomotive or like construction, for quickly and easily parting the piston rod and crosshead.

The invention claimed is:—

1. In apparatus of the class described, the combination of a pair of spaced plates, each having spaced apertures in alignment, a transverse member in each aligned pair of apertures, one of said members supporting the crosshead and piston rod to be separated and provided with a transverse opening in alignment with the piston rod, a cylinder supported by the other member, a parting plunger in said cylinder slidable through said opening, and piston means within the cylinder and operatively associated with the plunger for moving the same by increase of pressure in the cylinder.

2. In apparatus of the class described, the combination of a pair of spaced plates, each having an aperture in each end and in alignment, means supported by one set of said apertures, a cylinder supported between the plates and by said means, a pin supporting the crosshead and piston assembly to be separated, a piston in said cylinder, a piston rod engaging plunger having operative connection with the piston associated with said cylinder, and a flange construction at each end of the pin for detachably mounting and locking association with said plates through the aligned second set of apertures.

3. Apparatus for parting purposes including a piston rod engaging plunger, a cylinder, a piston therein having operative connection with the plunger, means detachably supporting said cylinder in predetermined position relative to the crosshead and supported by the same, a check valve and plunger construction for supplying pressure to the cylinder and building up and retaining the pressure therein, a spring normally constrained to position the piston in plunger retracted position, and a manually controlled release for relieving the pressure in said cylinder to permit said spring to become operative.

4. Apparatus for parting purposes including a piston rod engaging plunger, a cylinder, a piston therein having operative connection with the plunger, means detachably supporting said cylinder in predetermined position relative to the crosshead and supported by the same, a check valve and plunger construction for supplying pressure to the cylinder and building up and retaining the pressure therein, a spring normally constrained to position the piston in plunger retracted position, and a manually controlled release for relieving the pressure in said cylinder to permit said spring to become operative, said release and check valve construction including a portion constituting a common intake and discharge.

In witness whereof, we have hereunto affixed our signatures.

ALBERT W. MARTIN.
JACOB N. MARTIN.